US008688286B2

(12) United States Patent
Nelson et al.

(10) Patent No.: US 8,688,286 B2
(45) Date of Patent: Apr. 1, 2014

(54) METHOD FOR MAINTAINING AN OPTIMAL AMOUNT OF ENERGY DERIVED FROM A POWER GENERATION SYSTEM IN A STORAGE DEVICE

(75) Inventors: Robert J. Nelson, Orlando, FL (US); Bryan T. Lin, Orlando, FL (US)

(73) Assignee: Siemens Aktiengesellschaft, München (DE)

( * ) Notice: Subject to any disclaimer, the term of this patent is extended or adjusted under 35 U.S.C. 154(b) by 337 days.

(21) Appl. No.: 13/205,679

(22) Filed: Aug. 9, 2011

(65) Prior Publication Data

US 2013/0041517 A1 Feb. 14, 2013

(51) Int. Cl.
- *G05D 11/00* (2006.01)
- *H02J 7/00* (2006.01)
- *F03D 9/00* (2006.01)

(52) U.S. Cl.
USPC ........... 700/297; 700/286; 700/295; 320/101; 320/107; 290/44

(58) Field of Classification Search
None
See application file for complete search history.

(56) References Cited

U.S. PATENT DOCUMENTS

| 2008/0179887 A1* | 7/2008 | Kawazoe et al. ................ 290/44 |
| 2010/0138058 A1* | 6/2010 | Kirchner et al. ............... 700/286 |
| 2011/0273129 A1* | 11/2011 | Coe et al. ....................... 320/101 |

FOREIGN PATENT DOCUMENTS

JP 2010220406 A 9/2010

* cited by examiner

*Primary Examiner* — Sean Shechtman

(57) ABSTRACT

A method for controlling an amount of power delivered by a power source (16) to a power line (32). An energy storage unit (38) receives portions of energy generated by the source and provides stored energy to supplement power output from the source to the power line. Maximum and minimum limits define a range of change in the power delivered to the power line by the power subsystem. An amount of power to be delivered by each of the source and the energy storage unit to the power line is based on (i) a determined amount of power available for delivery directly to the power line from the power source, (ii) a determined level of energy in the storage unit available for delivery to the power line, and (iii) the limits in the range of change in the power to be delivered by the power source to the power line.

17 Claims, 1 Drawing Sheet

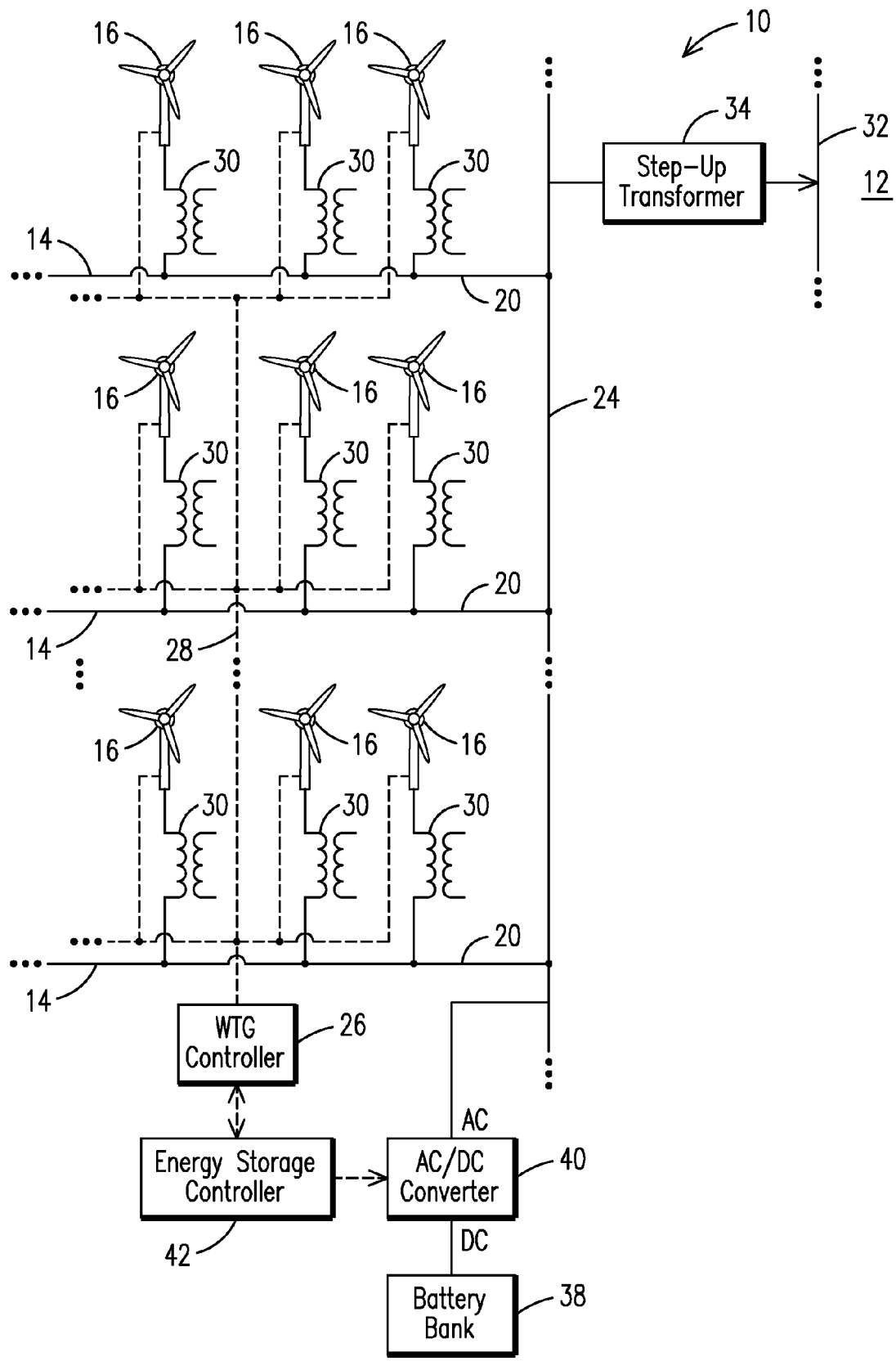

METHOD FOR MAINTAINING AN OPTIMAL AMOUNT OF ENERGY DERIVED FROM A POWER GENERATION SYSTEM IN A STORAGE DEVICE

FIELD OF THE INVENTION

The present invention relates generally to power generation systems and, more particularly to systems deriving power from a variable source such as wind energy and solar energy.

BACKGROUND OF THE INVENTION

The present invention is described in the context of a wind farm used for electric power generation but is applicable to numerous types of power generation systems including, for example, systems which generate electricity from solar cells and systems which generate electric power from wave energy. A feature common to these and other sources of green power is that the power output fluctuates, e.g., based on weather conditions. Yet it is desirable to integrate outputs from these sources with outputs from other electric power systems in a network. The network may be for the use of a local utility or part of a regional or even larger electric transmission network from which the power is distributed. It is desirable to find ways to improve the manner in which fluctuating power outputs, such as those resulting from some green power sources, are provided to lines which receive power from multiple sources.

BRIEF DESCRIPTION OF THE DRAWINGS

The invention is explained in the following description in view of the drawing which illustrates a system that provides power to a transmission line according to an embodiment of the invention.

DETAILED DESCRIPTION OF THE INVENTION

A typical wind park may have hundreds of wind turbine generators (WTGs) connected to a common line for summation of power and integration into a network. The park may extend over hundreds of square kilometers. Many parks are situated over land but it is often preferred that they be built over large bodies of water to capture greater amounts of energy from relatively strong winds. The arrangement typically includes step-up transformers which interface the power into a higher voltage transmission system. Although a wind park may at times be capable of generating levels of power that meet or exceed total system demand, there remains a need for back-up capacity to provide power during periods when wind speeds are too low to meet demand. An ideal situation is one in which there are no sudden increases or drops in wind speed but, rather, a relatively constant wind speed. However, significant wind fluctuations are prevalent in essentially all geographic regions having relatively high wind speeds. The resulting variable power generation must be accommodated when transferring the generated power to a network in order to provide a relatively stable level of power through the network. At times it is desirable to provide controls which assure compliance with interface requirements of the lines which connect one or more WTGs to a network.

The sole FIGURE is a simplified block diagram of a system 10 according to an embodiment of the invention which provides power to a network or grid 12. The system 10 includes a plurality of feeder circuits 14 positioned in a wind park. Each circuit 14 includes a series of WTGs 16 which generate power for transfer through a collector line segment 20 to a medium high voltage bus line 24 of the network 14. A WTG park controller 26 determines the output of each WTG 16 via communication data lines 28 connected to each WTG 16. A transformer 30 at each WTG 16 steps the power generated by that WTG up to a medium high voltage, e.g., 30-40 KV, prior to transfer of the power to the bus line 24. A high voltage transmission line 32 in the network 12 is connected to receive power from the bus line 24 through a park transformer 34 which steps the bus line voltage up to a still higher transmission voltage, e.g., 100 to 200 KV.

The system 10 further includes a battery bank 38, serving as an energy storage unit, connected to the bus line 24 through an AC-to-DC converter 40 under the supervision of an energy storage controller 42. The battery bank 38 may receive portions of the power output to the bus line 24 or provide power to the bus line 24. The energy storage controller 42 selectively controls the AC-to-DC converter 40 to place the battery bank 38 in either a charge or discharge mode. Transition of batteries in the bank from a charging and storage mode to a discharge mode, and vice versa is controlled in a conventional manner. For example, a bridge composed of electronic switches, e.g., thyristors or IGBTs, controls voltage applied to the bank of batteries.

When the bridge voltage is higher than that of the batteries in the bank, and the bridge is allowed to conduct, power flows from the power source to the batteries and energy is stored. Power continues to flow until the bridge is commutated by either the battery voltage or by a self-commutation function. When the bridge voltage is lower than that of the batteries and the bridge is allowed to conduct, power flows from batteries in the bank to the power line and energy is discharged until the bridge is commutated by the system voltage or by a self-commutation function.

The invention provides for control of power output to a line as well as inputs to or outputs from an energy storage unit, e.g., the battery bank 38. As used with reference to the illustrated embodiments, the term line means a transmission line such as the bus line 24 or the transmission line 32 which receives power from one or more WTGs. More generally, the term line also refers to any power line which carries power output from one or more sources where the sources are not limited to green power sources. In one example the line receives energy from a combination of any type of power generation system and a storage unit in a manner which limits temporal variations in output to the line within a predefined range, e.g., a range having defined upper and lower limits. The storage unit receives energy from the power generation system as a function of fluctuations in output from the power generation system. The amount of change in power to the line, between one time period and a subsequent time period, is controlled such that the level of power is constrained to a sub-range within the defined range of permitted temporal fluctuation in power level output to the line. The sub-range may be adjusted from time period to time period in order to control the amount of energy in the storage unit, e.g., relative to the capacity of the storage unit. The time periods during which such control is effected may be uniform or variable.

According to an embodiment of the invention, variation(s) in power delivered to the line are permitted within limits of the sub-range. Another feature in accord with an example embodiment of the invention is that the level of energy in the storage unit is maintained within a defined energy range. Maintaining energy levels in the storage unit which are within the defined range of storage (i) assures that the storage unit can output sufficient supplementary power to the line when a drop in power output from the generation system would otherwise cause the temporal variation in output to the line to fall below the lower limit of the predefined range; and (ii) also assures that the storage unit has capacity to receive sufficient power from the generation system for energy storage when an increase in power output from the generation system would otherwise cause the temporal variation in output to the line to exceed the upper limit of the predefined range. Thus the invention provides control of power output to the line and maintains a fixed level of energy storage (e.g., fifty percent of the capacity of the storage unit) within a defined energy range (e.g., +/−three percent).

A method according to the invention compares the power available for output during a current time period (e.g., in a series of equal periods such as one minute or one second time periods) with the power received by the line during an immediately preceding period in the series. If the power available during the current period exceeds the amount of power received by the line during the immediately preceding period, the power output from the generation system to the line is permitted to increase during the current period to a level consistent with the upper limit of the predefined range within which the temporal variation in output power is limited. Excess power, i.e., the difference between the power available from the power generation system during the current period and the amount of power actually output to the line during the current period, is sent to the storage unit by the controller 42 for storage. However, if the amount of stored energy reaches the upper limit in the defined range of energy storage (e.g., three percent above fifty percent storage capacity) then the sub-range within the defined range, which limits temporal variation in output to the line, may be adjusted for at least the current time period in order to reduce the amount of energy added during to the storage unit the current time period. For example, the upper limit of the sub-range within the predefined range to which the temporal variation in output power is limited may be elevated while the lower limit of the sub-range may also be elevated, thereby introducing a bias which disposes more power transfer to the line and which diminishes the amount of energy transferred to or held in the storage unit.

If the amount of energy stored in the battery bank 38 diminishes to the lower limit of the defined energy range (e.g., three percent below fifty percent storage capacity) then the sub-range, within the predefined range to which the temporal variation in output power is limited, may be adjusted for at least the current time period in order to increase the amount of energy being added to the storage unit. For example, the upper limit of the sub-range can be lowered while the lower limit of the sub-range is also lowered, thereby introducing a bias which disposes less power transfer to the line and which increases the amount of energy in the storage unit.

By adjusting the upper and lower limits of a sub-range within the predefined range to which the temporal variation in output power is limited, it becomes possible to maintain stringent limits in the temporal variation in power output to the line while also maintaining a relatively stable level (e.g., +/−three percent) of energy in the storage unit. Despite relatively large fluctuations in output from the power generation system, such as result under gusty wind conditions, it is possible to comply with limits on the temporal variation in power output to the line and at the same time assure that the storage unit contains a consistent amount of energy available on demand.

Operation of the system 10 according to an embodiment of the invention begins with a determination of the total available wind power $P_A(t_i)$ on the bus line 24 during each in a sequence of uniform time periods, $t_i$, for values of i ranging from −L to +L. In one example, for a given value of i, a sequence of time periods consists of 2L+1 periods: $t_{i-L} \ldots t_{i-5}, t_{i-4}, t_{i-3}, t_{i-2}, t_{i-1}, t_i, t_{i+1}, t_{i+2}, t_{i+3}, t_{i+4}, \ldots t_{i+L}$.

$P_A(t_i)$ may be measured or may be calculated based on measured wind velocity, $V(t_i)$ as experienced by each of the WTGs 16 during each time period $t_i$. The calculations are made in accord with appropriate wind speed-power curve conversions for each WTG. The conversions may be based on look-up tables or mathematical models exercised for each time period $t_i$ based on measured wind velocities.

$P_{out}(t_{i-1})$ is the amount of power actually output from the bus line 24 to the transmission line 32 during the time period $t_{i-1}$ which immediately precedes the time period $t_i$. More generally, for an arbitrary one of the time periods $t_{i+c}$, where c may be a positive or negative integer, $P_{out}(t_{i+c})$ is the amount of power actually output from the bus line 24 to the transmission line 32 during one of the time periods to $t_{i-L}$ to $t_{i+L}$. $P_{out}(t_{i+c})$ may be a measured quantity or may be based in part on a combination of measured wind velocities, wind speed-power curve conversions, and quantities $\Delta P(t_{i+c})$ and k, which also varies among the time periods as explained herein.

$\Delta P(t_i)$ is the difference between the power available during the time period $t_i$ and $P_{out}(t_{i-1})$:

$$\Delta P(t_i) = P_A(t_i) - P_{out}(t_{i-1})$$

Similarly, $\Delta P(t_{i-1})$ is the difference between the available power during the time period $t = t_{i-1}$ and $P_{out}(t_{i-2})$ where $t_{i-2}$ is the time period immediately preceding the time period $t_{i-1}$:

$$\Delta P(t_{i-1}) = P_A(t_{i-1}) - P_{out}(t_{i-2})$$

Generally, for an arbitrary one of the intervals $t_{i+c}$, where c is an integer, $$\Delta P(t_{i+c}) = P_A(t_{i+c}) - P_{out}(t_{i+c-1}).$$

$k(t_i)$ is a factor determinative of the portion of $\Delta P(t_i)$ added to or decremented from $P_{out}(t_{i-1})$ to define $P_{out}(t_i)$. More generally, for an arbitrary one of the intervals $t_{i+c}$, $k(t_{i+c})$ is a factor used to determine the portion of $\Delta P(t_{i+c})$ that is to be added to or decremented from $P_{out}(t_{i+c-1})$ to define $P_{out}(t_{i+c})$. In one series of embodiments, k is a function of:

$E_s$, amount of energy stored in the battery bank 38, $E_{s\,Max}$, the maximum permitted storage level in the battery, and $E_{s\,Min}$, the minimum permitted storage level in the battery.

In one embodiment, when $\Delta P(t_{i+c}) = 0$, no portion of $\Delta P(t_i)$ is added to or decremented from $P_{out}(t_{i+c-1})$ to define $P_{out}(t_{i+c})$. When $\Delta P(t_{i+c}) > 0$ or $\Delta P(t_{i+c}) < 0$, if $$\frac{E_s - E_{smin}}{E_{smax} - E_{smin}} > 1,$$

then $k(t_{i+c}) = 1$
and when $$0 < \frac{E_s - E_{smin}}{E_{smax} - E_{smin}} < 1:$$

$$k(t_{i+c}) = C * \frac{E_s - E_{smin}}{E_{smax} - E_{smin}}$$

if $E_s$ is outside of the desired storage range, and $k(t_{i+c})=f(E_s, E_{smin}, E_{smax}, \Delta P', V(t_{i-1}), V(t_{i-1}))$ if $E_s$ is inside the desired storage range, where:

C is a constant that may be a function of the energy storage device, $\Delta P'$ is the maximum permissible variation in park output power between consecutive time periods, e.g., $t_{i-1}$, $t_i$, $V(t_{i-1})$ is the wind speed during a prior time period $t_{i-1}$ immediately preceding the time period $t_i$, and $V(t_i)$ is the wind speed during a current time period $t_i$.

and when $$\frac{E_s - E_{smin}}{E_{smax} - E_{smin}} < 0,$$

$k(t_{i+c})=0$.

$\Delta E_s$, the corresponding change in energy stored in the battery, during an arbitrary one of the time periods $t_{i+c}$, relative to the immediately preceding time period $t_{i+c-1}$ is:

$$\Delta E_s(t_{i+c}) = \eta_s \Delta t (1-k) \Delta P(t_{i+c})$$

where $\eta_s$ is the associated transfer efficiency, i.e., either for storing charge in the battery or removing charge from the battery, where $\Delta t$ is the duration of the time intervals $t_{i+c}$ and $t_{i+c-1}$, and where $\Delta P(t_{i+c})$ is the difference between the power available during the time interval $(t_{i+c})$ and $P_{out}$ during the time period $(t_{i+c-1})$.

Consequently, the net amount of energy stored in the battery during an arbitrary one of the time intervals $t_{i+c}$ is $$E_s(t_{i+c}) = \Delta E_s(t_{i+c}) + E_s(t_{i+c-1})$$

where $E_s(t_{i+c-1})$ is the amount of energy stored in the battery during the immediately preceding time period $t_{i+c-1}$.

Although the duration of a time period may vary, in an example illustrative of a method according to the invention, $\Delta t$, the duration of each of the time periods (e.g., $t_{i-k} \ldots t_{i-1}$, $t_i$, $t_{i+1} \ldots t_{i+k}$), is set at one second. The range of change in power output to the transmission line 32 between each time period and a next time period has an upper bound equal to 110 percent of the total power output during the immediate preceding period (corresponding to a maximum permitted increase in power being output to the line 32) and a lower bound of 90 percent of the total power output during the immediate preceding period (corresponding to a maximum permitted decrease in power being output to the line 32). The method defines, on a time period by time period basis, amounts of power within this range for output to the line 32 such that the amount of energy in the battery bank 38 may be maintained within a defined range.

Specifically, the range of permitted energy storage in the battery bank may extend between one and nine MWh. That is, $E_{s\ Min}=1$ MWh and $E_{s\ Max}=9$ MWh. Determination of an acceptable range of storage depends on numerous factors, including the overall storage capacity, the range of temporally permitted increases and decreases in power output to the line 32, and anticipated fluctuations in power generated by the feeder circuits 14. In this example, it is assumed that the battery bank is characterized by a charge transfer efficiency $\eta_s = \eta_s^+$ of 0.9 and the reciprocal of drain transfer efficiency $\eta_s = \eta_s^-$ of 1.15, where the drain transfer efficiency is 1/1.15.

With the foregoing constraints, during a time period for which $i=0$:

$P_{out}(t_0)=10$ MW, the wind velocity $V(t_0)$ at each WTG 16 is 10 m/s, and $E_s(t_0)$, the amount of energy stored in the battery bank, is 5 MWh.

and during the next time period (i.e., the period for which $i=1$):

the wind velocity $V(t_1)$ at each WTG 16 is 11 m/s, the total available wind power $P_A(t_1)$, which is a function of $(V(t_i))$, is 11 MW, and $\Delta P(t_1)=P_{out}(t_1)-P_{out}(t_0)=1$ MW. With $\Delta P(t_1)>0$, when $E_s=E_s(t_0)$, and recalling, when $$0 < \frac{E_s - E_{smin}}{E_{smax} - E_{smin}} < 1,$$

$$k = C * \frac{E_s - E_{smin}}{E_{smax} - E_{smin}} = 0.5$$

Assuming our desired energy storage is 70% to 80% of Esmax, this is outside of the desired range. Setting C equal to 1.0 and setting k equal to 0.5 in this example, then:

$P_{out}(t_1) = k \Delta P(t_1) + P_{out}(t_0) = (0.5)(1 \text{ MW}) + 10 \text{ MW} = 10.5 \text{ MW}$ while the maximum permitted increase in power being output to the line 32 is 110 percent of 10 MW, or 11 MW, and the maximum permitted decrease in power output to the line 32 is 90 percent of 10 MW, or 9 MW.

$\Delta E_s(t_1)$, the change in the amount of energy stored in the battery bank between the periods $t_0$ and $t_1$ is then:

$$\Delta E_s(t_1) = (1-k) * \Delta P(t_1) * (\Delta t) * \eta_s$$
$$= (1-0.5) * (1 \text{ MW}) * (1s) * 0.9$$
$$= 0.45 \text{ MWs}$$
$$= 0.000125 \text{ MWh}$$

and $E_s(t_1)$, the amount of energy stored in the battery bank, is given by $$E_s(t_1) = \Delta E_{s,1} + E_{s,1}$$
$$= 0.000125 \text{ MWh} + 5 \text{ MWh}$$
$$= 5.000125 \text{ MWh}.$$

A method has been described for controlling an amount of power delivered by a power source to a power line. In the disclosed example, the power source comprises a plurality of wind turbine generators in a system which generates a variable amount of electric power based on fluctuations in the wind speed. The method includes providing a power subsystem comprising the source and an energy storage unit and operating the energy storage unit (i) to receive and contain portions of energy generated by the system to limit power provided directly to the power line by the source and (ii) to provide portions of energy stored therein to the power line to supplement power directly output from the source to the power line. Maximum and minimum limits are defined for a range of change in the power delivered to the power line by the power subsystem. During each in a sequence of time periods, an amount of power to be delivered by each of the source and the energy storage unit to the power line is defined based on (i) a determined amount of power available for delivery directly to the power line from the power source, (ii) a determined level of energy in the storage unit available for delivery to the power line, and (iii) the limits in the range of change in the power to be delivered by the power subsystem to the power line. In one series of embodiments, the storage unit is a bank of batteries providing an energy storage range corresponding to the capacity of the battery bank. Operation of the storage unit includes maintaining a level of energy in the storage unit which is within a variable storage range smaller than the energy storage range. In some embodiments, the sequence of time periods comprises a plurality of equal time periods, and power available for output to the power line from the power source during a first period in the sequence of time periods is compared with the power received by the line during a second time period occurring prior to the first period. When the power available during the first period exceeds the amount of power received by the line during the second and prior time period, the power output directly from the source to the power line is permitted to increase during the first period to a level which does not exceed the defined maximum limit in the range of change in the power; and other power available from the source during the first period is applied to the storage unit.

Also according to embodiments of the invention, power available for output to the power line from the power source during a third period in the sequence of time periods is compared with the power received by the line during a fourth time period occurring prior to the second period, and the storage unit has an energy storage range having an upper limit. The level of energy maintained in the storage unit is within a first energy operating range having an upper limit smaller than the upper limit of the energy storage range. When the amount of energy in the storage unit reaches the upper limit of the first energy operating range, the power output directly from the source to the power line during the third period is increased relative to the power output during the fourth time period to reduce the amount of energy added to the storage unit during the third time period.

In still another embodiment, when the power available during the third period exceeds the amount of power received by the line during the fourth and prior time period, the power output directly from the source to the power line is permitted to increase during the third period to a level which does not exceed the defined maximum limit in the range of change in the power, and other power available from the source during the third period is applied to the storage unit.

When the storage unit has an energy storage range having a lower limit and operating the storage unit includes maintaining a level of energy in the storage unit within a first energy operating range having a lower limit greater than the lower limit of the energy storage range, and when the amount of energy in the storage unit diminishes to the lower limit of the first energy operating range: the power output directly from the source to the power line during the third period is decreased relative to the power output during the fourth time period to increase the amount of energy added to the storage unit during the third time period.

In the foregoing examples, the second time period is the period in the sequence which immediately precedes the first time period and the fourth time period is the period in the sequence which immediately precedes the third time period. Also, compliance within defined limits in the range of change in power delivered to the power line by the subsystem may be had by adjusting the level of energy in the storage unit.

While various embodiments of the present invention have been shown and described herein, such embodiments are provided by way of example only. Numerous changes and substitutions may be made without departing from the invention herein. Accordingly, it is intended that the invention be limited only by the spirit and scope of the appended claims.

The claimed invention is:

1. In a system which generates a variable amount of electric power based on fluctuations in the amount of power received from a power source, a method for controlling an amount of power delivered by the power source to a power line, comprising:

providing a power subsystem comprising the power source and an energy storage unit;

operating the energy storage unit (i) to receive and contain portions of energy generated by the system to limit power provided directly to the power line by the power source and (ii) to provide portions of energy stored therein to the power line to supplement output power directly output from the power source to the power line;

defining maximum and minimum limits in a range of change in the power delivered to the power line by the power subsystem;

during each in a sequence of time periods, defining an amount of power to be delivered by each of the power source and the energy storage unit to the power line based on (i) a determined amount of power available for delivery directly to the power line from the power source, (ii) a determined level of energy in the storage unit available for delivery to the power line, and (iii) the limits in the range of change in the power to be delivered by the power subsystem to the power line wherein:

output power available for output to the power line directly from the power source during a first period in the sequence of time periods is compared with the power received by the line during a second time period occurring prior to the first period, and when the power available during the first period exceeds the amount of power received by the line during the second and prior time period:

the power output directly from the power source to the power line is permitted to increase during the first period to a level which does not exceed the defined maximum limit in the range of change in the power, and other power available from the power source during the first period is applied to the storage unit.

2. The method of claim 1 wherein the storage unit has an energy storage range and operating the storage unit includes maintaining a level of energy in the storage unit which is within a variable storage range smaller than the energy storage range.

3. The method of claim 1 wherein the sequence of time periods comprises a plurality of equal time periods.

4. The method of claim 3 wherein:

power available for output to the power line directly from the power source during a third period in the sequence of time periods is compared with the power received by the line during a fourth time period occurring prior to the second period, the storage unit has an energy storage range having an upper limit and operating the storage unit includes maintaining a level of energy in the storage unit within a first energy operating range having an upper limit smaller than the upper limit of the energy storage range, and when the amount of energy in the storage unit reaches the upper limit of the first energy operating range, the power output directly from the power source to the power line during the third period is increased relative to the power output directly from the power source to the power line during the fourth time period to reduce the amount of energy added to the storage unit during the third time period.

5. The method of claim 4 wherein:
the power available during the third period exceeds the amount of power received by the line during the fourth and prior time period,
the power output directly from the power source to the power line is permitted to increase during the third period to a level which does not exceed the defined maximum limit in the range of change in the power, and
other power available from the power source during the third period is applied to the storage unit.

6. The method of claim 4 wherein, when
the storage unit has an energy storage range having a lower limit and operating the storage unit includes maintaining a level of energy in the storage unit within a first energy operating range having a lower limit greater than the lower limit of the energy storage range, and
when the amount of energy in the storage unit diminishes to the lower limit of the first energy operating range, the power output directly from the power source to the power line during the third period is decreased relative to the power output during the fourth time period to increase the amount of energy added to the storage unit during the third time period.

7. The method of claim 3 wherein the second time period is the period in the sequence which immediately precedes the first time period.

8. The method of claim 4 wherein the fourth time period is the period in the sequence which immediately precedes the third time period.

9. The method of claim 1 wherein compliance within defined limits in the range of change in power delivered to the power line by the subsystem is had by adjusting the level of energy in the storage unit.

10. The method according to claim 1 wherein a determination of actual output from the power source to the power line during a first time period is based on a difference between available power for output from the power source to the power line during the first time period and the amount of power output from the power source to the power line in a preceding time period.

11. The method of claim 10 wherein the actual output during the first time period is the product of a factor times the difference between available power for output from the power source to the power line during the first time period and the amount of power output from the power source to the power line in a preceding time period.

12. The method of claim 11 wherein under at least some circumstances, the factor is a function of:

$$\frac{E_s - E_{smin}}{E_{smax} - E_{smin}}$$

where:
$E_s$, amount of energy stored in the battery bank 38,
$E_{s\,Max}$, the maximum permitted storage level in the battery, and
$E_{s\,Min}$, the minimum permitted storage level in the battery.

13. The method of claim 12 wherein a change in energy in the energy storage unit during the first time period is $$\eta_s \Delta t (1-k) \Delta P(t_{i+c})$$

where $t_i$ is a time period in a sequence of time periods, i is an integer value, c is an integer value, $\eta_s$ is the associated transfer efficiency, $\Delta t$ is the duration of each time period, $\Delta P$ is the difference between the power available during the first time period and the amount of power received by the power line during the preceding time period and k is a factor determinative of a portion of $\Delta P$ added to or decremented from the output power.

14. The method of claim 1 wherein the amount of energy in the storage unit available for delivery to the power line during each in a plurality of the time periods is an energy range centered about fifty percent of the capacity of the storage unit.

15. The method of claim 14 wherein the energy range is plus or minus three percent of fifty percent of the capacity of the storage unit.

16. The method of claim 1 wherein the storage unit comprises a battery.

17. The method of claim 12 wherein the factor is also a function of:
the difference between the power available during the time period $t_i$ and the power output during a preceding time period.

* * * * *